2,829,914

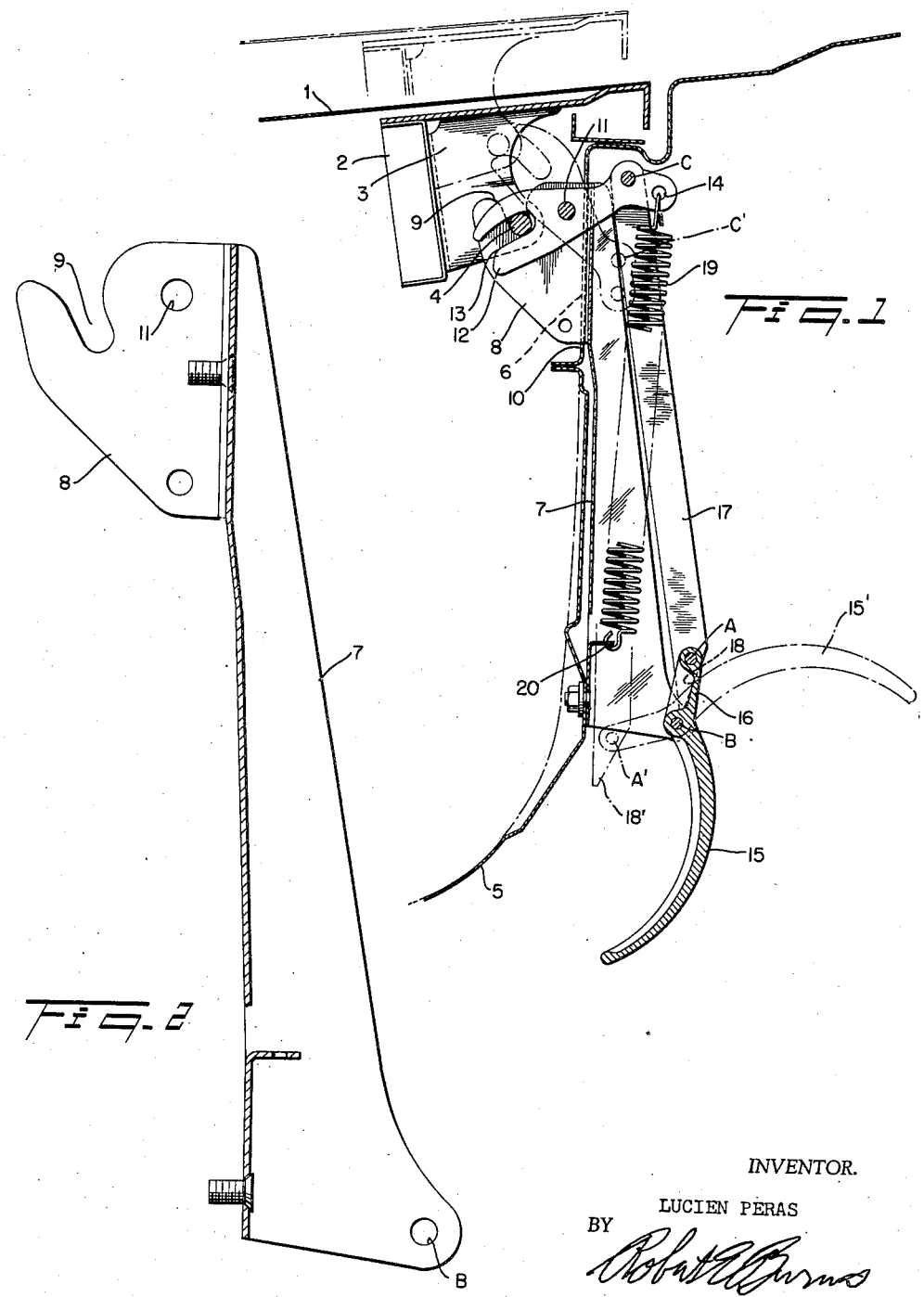

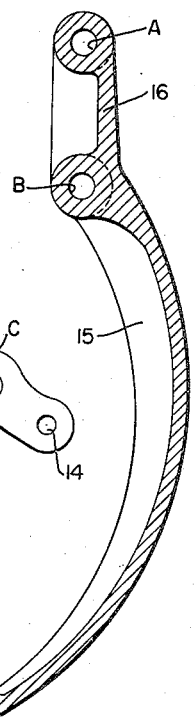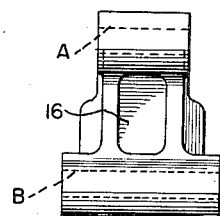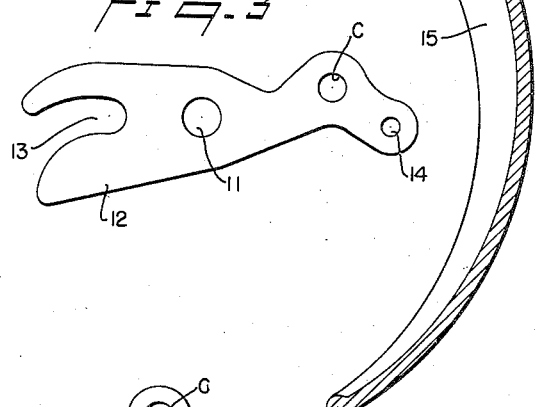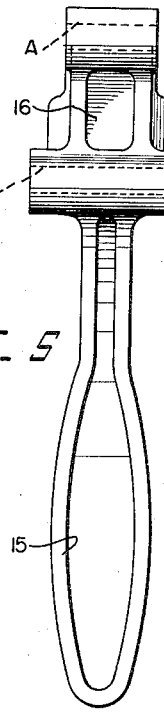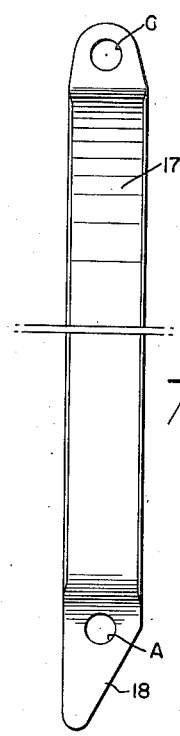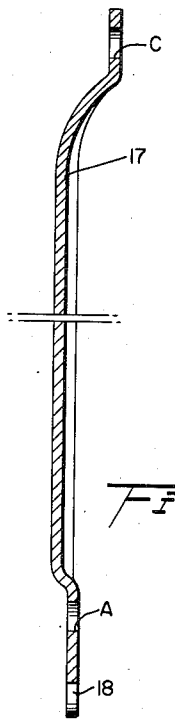
INVENTOR.
LUCIEN PERAS
ATTORNEY

United States Patent Office 2,829,914
Patented Apr. 8, 1958

LOCKING MECHANISM FOR VEHICLE HOOD

Lucien Péras, Billancourt, France, assignor to Regie Nationale des Usines Renault, Billancourt, France, French works under the control and the authority of the French Government Application January 24, 1956, Serial No. 561,080

Claims priority, application France February 4, 1955

2 Claims. (Cl. 292—217)

The invention relates to a fastener for closing movable panels articulated to an enclosure, more particularly applicable to closing motor vehicle bonnets or hoods, and, in accordance with the embodiment given by way of example, to hoods opening towards the front, that is to say from the rear to the front, the operation being controlled from inside the vehicle, the articulating hinge being at the external end of the panel.

The closure fastener or hood locking mechanism forming the subject of the invention has the following advantages:

Control of hood-opening from inside the vehicle, safety against theft, no external locks with the risk of freezing or rusting.

When the hood is closed it is firmly pressed and held against its mounting by the locking mechanism, thus avoiding sources of noise and rattles.

Upon opening, a hook acted on by a spring ejects the hood or bonnet from its mounting and holds it open, leaving sufficient space to grasp it by hand and open it completely.

In the attached drawing:

Fig. 1 is a longitudinal section of the front portion of a vehicle with a hood equipped with a closure fastener in accordance with the invention;

Fig. 2 is a left-hand view of the fixed element of the fastener;

Fig. 3 shows the fastener hook in detail;

Figs. 4 and 5 are a longitudinal section and end view of the control lever;

Figs. 6 and 7 show a side view and end view of the links connecting the control lever to the fastener hook.

If reference is made to the drawing, it will be seen that the hood or bonnet 1 of the car is reinforced by a cross-member 2 carrying a bracket 3 between the branches of which is fixed a shaft 4.

An apron 5 seperating the front or engine enclosure from the part intended for the passengers is extended vertically at 6 by a sheet metal scuttle situated behind the instrument panel not shown.

A support member 7 (shown separate from the assembly in Fig. 2) attached to the apron 5, is of U-section, and carries an extension or bracket 8 at the top attached by welding or riveting, and having a lyre-shaped aperture 9 whereof the axis is directed along the tangent to the movement of the bonnet, taking up the pressure of the bonnet, and allowing it to be centered by way of the shaft 4. The sheet metal member 6 is provided with an aperture 10 allowing the projecting bracket 8 to pass. The bracket 8 carries a shaft 11 perpendicular to the plane of the bracket, and on which pivots a hook 12 shown in detail in Fig. 3. The hook 12 has a fairly deep slot or recess 13 in the end forward of its articulation, and to the rear an aperture receiving the shaft C, perpendicular to its plane and is provided further to the rear with a circular hole 14.

The support member 7 carries a shaft B at the bottom, parallel to the plane of the apron as shown; a lever 15 having the shape of a handle at the bottom can pivot on this shaft. The lever 15 is provided at the top with a shaft A parallel to the shaft B. Ears 16 take up pressure from the links 17 at the end of the closing stroke and extend on both sides between the shafts A and B.

Two links 17, shown in detail in Figs. 6 and 7, are articulated to the above mentioned shafts A and C. These links are bent back at the top so as to be in contact with the hook 12 on the one hand and the other at the place where they are articulated to the shaft C. They are somewhat spaced from one another in their middle portions, and are substantially parallel, allowing a central spring 19 to move freely between them. They are chamfered at the bottom, forming supporting surfaces 18 inclined in relation to their longitudinal axis, and come into contact with the ears 16 of the lever 15 in the closed position of the bonnet as shown in Fig. 1. When the bonnet is closed the shaft A will then be to the rear of the line joining the shafts B and C.

A coil spring 19 is stretched between the aperture 14 in the hook 12 and a fixed member 20 situated at the bottom of the support member 7.

The locking mechanism operates as follows:

If it is assumed first of all that the bonnet is closed, the shaft 4, fast with the bonnet, is engaged simultaneously in the apertures 9 and 13 of the bracket 8 and of the hook 12, both being fast with the apron 6. The control lever 15 is then substantially vertical, the links 17 are in a raised position, the shaft C of the hook is in a raised position, and the aperture 13 is in its lower position.

In this closed position the bonnet is firmly held against its mounting, and can only be opened by operating the handle of the lever 15 from inside the car.

In fact, the shaft A is to the rear of the line of the shafts B and C. Consequently, if an effort is made to lift the bonnet from the outside, the recess 13 of the hook will tend to rise, and the shaft C will tend to move downwardly, pushing back the links 17, which will push against the shaft A, and the latter will be subjected to a force directed to the rear, as can easily be understood if reference is made to Fig. 1. However, the shaft A cannot be displaced to the rear because the chamfered surfaces 18 of the links 17 press against the ears 16 of the lever 15. This movement of the point A being impossible, the same applies to that of the hook, and consequently of the bonnet, which cannot be opened by external action.

It might be feared that in consequence of jolting the shaft A would not remain constantly to the rear of the line B—C. The above reasoning would then no longer be valid, and the bonnet could then be opened from outside. But this need not be feared, since the spring 19 always exerts a pull on the rear end of the hook 12, and tends to urge the shaft C downwards. Thus it will be seen that the shaft A is always forced to the rear, which prevents any risk of opening.

To open the bonnet, the user only has to lift the handle of the lever 15 by pulling it towards himself. The shaft A then takes up the position A', the links 17 move the shaft C as far as the position C', and the hook 12 pivots about the shaft 11, its forward part lifting.

The upper part of the recess of the hook 13 starts by moving away, thus freeing the shaft 4 fast with the bonnet, and then the lower part of the recess 13 pushes this shaft upwards, this latter movement taking place under the action of the spring 19, which adds to the user's action on the handle.

This movement is sufficient to lift the bonnet far enough to allow it to be completely lifted by passing the fingers between the bonnet and the scuttle of the body.

This bonnet locking mechanism has the following advantages:

It is of very simple construction and operation, it prevents opening of the bonnet by external means, upon opening, it lifts the bonnet high enough to allow it to be easily grasped.

I claim:

1. In a locking mechanism for securing a vehicle hood of the type pivoted at its forward end to permit the rear end to be raised and lowered, in combination a transverse member fixed to the underside of the rear movable end of said hood, a support member for engaging and receiving the transverse member when the hood is in a closed position, a pivotally mounted hook movable between a predetermined lower position for holding said transverse member seated against said support member locking the hood and a predetermined upper position for lifting said hood a predetermined distance, whereby when the hook is moved to its upper position the hood may be hand engaged and readily lifted to a determined maximum open position, the hook being adapted to receive said transverse member while in said upper position and to return said transverse member into engagement with said support member and the hood to a closed and locked position, linkage means operably connected to the hook for manually moving the hook between said lower and upper positions and for locking the hook by releasably holding the hook in said lower position, resilient means constantly biasing the hook to said upper position, whereby the hood is moved downwardly, closed and locked without slamming by engaging the transverse member with said hook while in said position and manually moving the hook to its lower position.

2. A locking mechanism for securing a vehicle hood according to claim 1, in which the vehicle has a passenger compartment and in which said linkage means comprises a driver-operated handle in said passenger compartment for moving the hook between said upper and lower positions, at least one link pivotally mounted on one end of said hook, the handle being movably connected to said link at a point at the opposite end and pivotally mounted at a point forward of said connecting point when said hood is in a closed position, said link being connected to the hook at a point lying in a plane forward of said handle pivoting point, the hook pivoting at a point forward of and below the point at which it is connected to the link, whereby when it is attempted to open the hood without manually moving said handle the link is moved in a downward direction against a portion of the handle lying between the handle pivot point and the point at which the handle is connected to the link tending to rotate said handle in a forward direction comprising a hood locking direction and said hood can be opened only from inside said compartment.

References Cited in the file of this patent

UNITED STATES PATENTS

| | | |
|---|---|---|
| 567,621 | Smith | Sept. 15, 1896 |
| 2,285,682 | Rhodes | June 9, 1942 |
| 2,326,533 | Greig | Aug. 10, 1943 |
| 2,469,113 | Hooker | May 3, 1949 |

FOREIGN PATENTS

| | | |
|---|---|---|
| 630,768 | Great Britain | Oct. 20, 1949 |